United States Patent [19]
Persson

[11] 4,228,941
[45] Oct. 21, 1980

[54] METHOD OF JOINING AN INNER METAL PIPE WITH AN OUTER SURROUNDING METAL PIPE

[75] Inventor: Ingemar P. Persson, Nora, Sweden
[73] Assignee: Nitro Nobel AB, Gyttorp, Sweden
[21] Appl. No.: 957,131
[22] Filed: Nov. 2, 1978
[30] Foreign Application Priority Data
  Nov. 24, 1977 [SE] Sweden .................. 7713287
[51] Int. Cl.³ .............................................. B23K 20/08
[52] U.S. Cl. ..................................... 228/107; 228/2.5; 228/50; 29/421 E
[58] Field of Search ............... 228/107, 50, 108, 109, 228/2.5, 154; 29/421 E

[56] References Cited
U.S. PATENT DOCUMENTS

| | | | |
|---|---|---|---|
| 2,173,109 | 9/1939 | Hamblin | 228/50 |
| 2,188,925 | 2/1940 | Ronay | 228/50 |
| 2,331,937 | 10/1943 | Schreiner | 228/50 |
| 2,847,958 | 8/1958 | Norton | 228/50 |
| 3,563,713 | 2/1971 | Rudd | 228/107 |
| 3,910,478 | 10/1975 | Howell | 228/107 |
| 3,985,279 | 10/1976 | Wilson | 228/109 |

Primary Examiner—Francis S. Husar
Assistant Examiner—Gene P. Crosby
Attorney, Agent, or Firm—Hane, Roberts, Spiecens & Cohen

[57] ABSTRACT

A method of joining an inner metal pipe with a surrounding outer metal pipe comprising placing inside the inner pipe a contact body which prevents change of the inside diameter of the inner pipe and detonating an explosive around the outer pipe so that the inner surface of the outer pipe is metallurgically joined to the outer surface of the inner pipe. The contact body is a rigid body made of salt and the contact body is removed after the pipes are joined by dissolving the contact body in a fluid in which the salt is soluable.

9 Claims, 4 Drawing Figures

METHOD OF JOINING AN INNER METAL PIPE WITH AN OUTER SURROUNDING METAL PIPE

FIELD OF THE INVENTION

The present invention relates to the joining of an inner metal pipe with an outer surrounding metal pipe by means of welding by explosion, which causes the outer surface of the inner pipe to be joined metallurgically with the inner surface of the outer pipe, and inside the inner pipe a contact body is arranged to prevent a change of the inside diameter of the inner pipe.

PRIOR ART

It is known to join two long pipes of equal dimensions with each other. Two ends of the two pipes are brought to lie true against each other or they are brought close to each other. A pipe socket is pulled over the two pipes. An explosive is applied to the outer surface of the pipe socket, which explosive can consist of nitroglycerine in diatomite, amatol or ammonium nitrate and oil. In order that the two pipes which are to be joined and the pipe socket are not deformed too greatly during the welding by explosion, it is necessary, to place an inside support close to the place joining. Heretofore, a metal body has been inserted. After the welding by explosion has been concluded, the metal body in question becomes jammed and difficult to remove, and the problem will be even greater if the two pipes to be joined have a substantial length.

SUMMARY OF THE INVENTION

The present invention is directed to a method of joining two pipes and seeks, to prevent difficulties in connection with the removal of the contact body. In accordance with the present invention the contact body can be easily removed without difficulty after a welding operation by explosion if the contact body consists of a rigid body made of salt.

According to one suitable embodiment of the invention, the contact body can be enclosed in a protective cover which is not permeable or it can be provided with a protective layer which is not permeable either. A suitable material for the cover is a plastic and a suitable material for the layer is a latex, a varnish or other layer which will not allow water to enter. The cover as well as the layer must not be soluble in water.

The contact body according to the present invention is composed in such a way that it will remain intact during the period of time when the pressure of detonation is in operation.

According to the present invention, it is suitable for the salt to be soluble in water, which will make it possible to flush away the contact body after the welding by explosion has been concluded.

According to the invention, the contact body can be formed by a salt mixture of sodium nitrite, sodium nitrate, and potassium nitrate. In such a salt mixture it is suitable to have 40% by weight of sodium nitrite, 7% by weight of sodium nitrate, and 53% by weight of potassium nitrate. Other mixtures of salt are possible, if they are castable and soluble in water.

BRIEF DESCRIPTION OF THE DRAWINGS

The invention will be described in further detail in conjunction with the enclosed drawings, wherein.

DETAILED DESCRIPTION

Figure 1A:
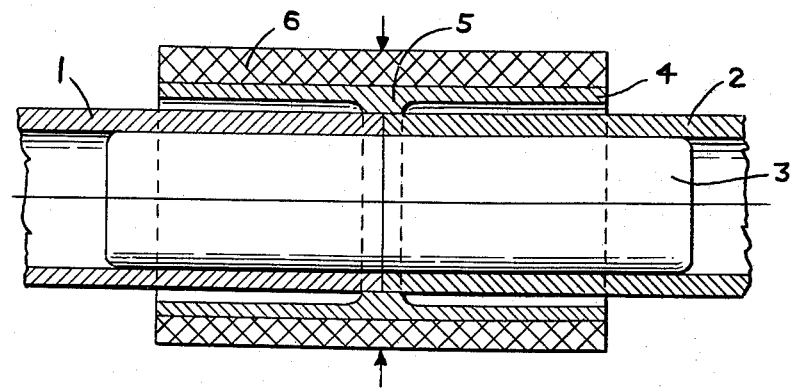
FIG. 1a is a sectional view illustrating a method of joining, according to the present invention, prior to the performance of the welding by explosion.
Figure 1B:
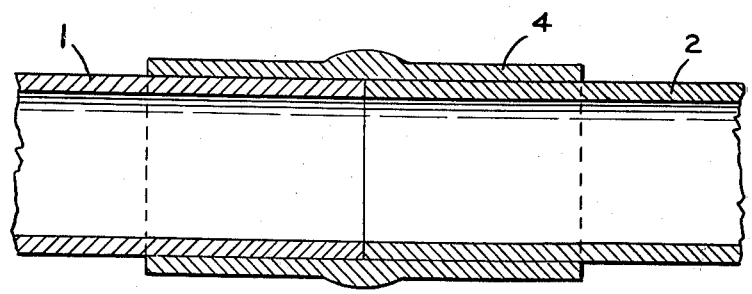
FIG. 1b shows the method of joining according to FIG. 1a after the performance of the welding by explosion.

In FIG. 1 are shown two pipes 1 and 2, which may have any cross section from an oval cross section to a circular and square cross section. Both of the pipes 1 and 2 are made of metal and they are of the same dimensions. The end edges of both of the pipes lie true against each other, and a contact body 3 has been inserted in both pipe ends which contact body lies against the inner surface of the two pipes 1 and 2. The purpose of the contact body is to act as a holder or anvil. A joining pipe 4 is pulled upon the two pipes 1 and 2. In its center the joining pipe has an inwardly directed annular fixing flange 5, which is intended to fix the opposite edges of the two pipes 1 and 2. A layer of explosive 6 is arranged on the outer surface of the joining pipe 4. At the initiating of the explosive 6, the joining pipe 4 will assume the shape as shown in FIG. 1b. The inner surface of the joining pipe is metallurgically joined with the outer surface of the two ends of the pipes 1 and 2.

The contact body 3 can be removed after completion of the welding by explosion by flushing water through one of the pipes 1 and 2, which will reach the contact body 3 and dissolve the contact body. If the contact body is provided with a protective cover it will be necessary to form a hole in the cover before the flushing with water takes place. Usually, the protective cover is automatically punctured at the time of the explosion. By employing a contact body of salt, the same advantage is obtained as by using a metal body, as the contact body of salt is not destroyed during the pressure of detonation.

Figure 2A:
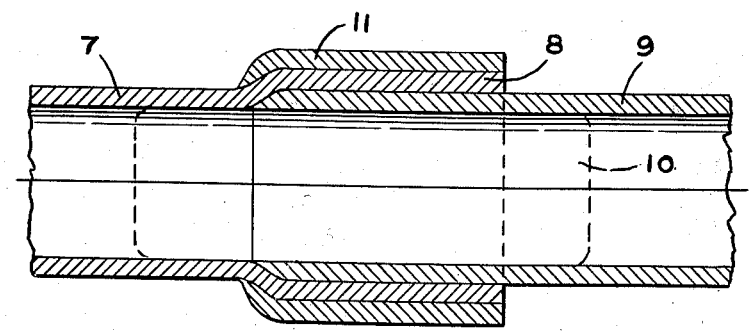
FIG. 2a is a sectional view which shows a method of joining two pipe ends inserted into each other, prior to the performance of the welding by explosion.
Figure 2B:
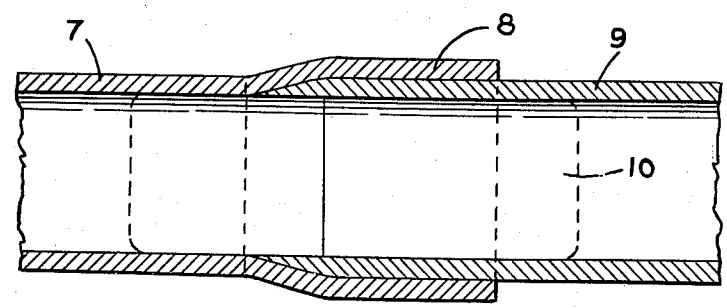
FIG. 2b shows the method of joining according to FIG. 2a after the performance of the welding by explosion.

In FIG. 2a is shown another method of joining two ends of the pipes 7 and 9. Through this method of joining, the application of an extra joining pipe is prevented. The right end 8 of the pipe 7 has been enlarged so that a pipe end is obtained with an inner diameter which corresponds to the outer diameter of the pipe 9. For this reason the pipe 9 can be pushed into the end 8 of the pipe 7. An explosive layer 11 has been placed outside the pipe end 8, and a contact body 10 has been arranged inside the two overlapping pipe ends. At the initiation of the explosive 11, the pipe ends of the pipes 7 and 9 are reshaped as shown in FIG. 2b. After the conclusion of the welding by explosion, the contact body 10 is removed in the manner mentioned above.

What is claimed is:

1. A method of joining an inner metal pipe with an outer surrounding metal pipe by welding by explosion such that the outer surface of the inner pipe is joined metallurgically with the inner surface of the outer pipe, the method comprising placing inside the inner pipe a contact body which prevents a change of the inside diameter of the inner pipe, said contact body being a rigid body made of salt.

2. A method as claimed in claim 1 wherein said contact body is provided with a protective cover or layer which is not permeable.

3. A method as claimed in claims 1 or 2 wherein said salt is soluble in water.

4. A method as claimed in claim 3, wherein said salt is a mixture of sodium nitrite, sodium nitrate, and potassium nitrate.

5. A method as claimed in claim 4, wherein said salt consists of 40% by weight of sodium nitrite, 7% by weight of sodium nitrate, and 53% by weight of potassium nitrate.

6. A method as claimed in claim 1 wherein said contact body is inserted into both ends of two straight pipes whose opposite ends are brought close to each other, placing a joining pipe over both ends of said pipes and applying force to said joining pipe by explosion to cause said joining pipe to be joined metallurgically with said straight pipes.

7. A method as claimed in claim 6, wherein said joining pipe is provided with an inwardly directed annular part for the fixation of the two opposise pipe ends.

8. A method as claimed in claim 1 wherein the two pipes are straight, said contact body being inserted in one end of the inner pipe, one end of the other pipe being opposite the first mentioned end and being enlarged so that it can be pulled upon the first mentioned end, the two pipe ends being metallurgically joined together after the pulling on.

9. A method as claimed in claim 1 comprising removing the contact body after joining the pipes by dissolving the contact body in a fluid in which said salt is soluble.

* * * * *